United States Patent [19]

Takashima et al.

[11] Patent Number: 4,827,363

[45] Date of Patent: May 2, 1989

[54] CASSETTE TAPE RECORDER

[75] Inventors: Shizuo Takashima, Chiba; Yoshio Segawa, Kanagawa, both of Japan

[73] Assignee: Sony Corporation, Tokyo, Japan

[21] Appl. No.: 196,757

[22] Filed: May 17, 1988

Related U.S. Application Data

[63] Continuation of Ser. No. 903,138, Sep. 3, 1986.

[30] Foreign Application Priority Data

Sep. 3, 1985 [JP] Japan .................. 60-194250

[51] Int. Cl.$^4$ .................. G11B 1/00; G11B 21/16
[52] U.S. Cl. .................. 360/961; 360/104; 360/137; 360/96.3
[58] Field of Search .................. 360/90, 93, 96.1–96.4, 360/105, 137, 104

[56] References Cited

U.S. PATENT DOCUMENTS

| 3,688,635 | 3/1971 | Fegen | 361/412 X |
|---|---|---|---|
| 3,899,795 | 8/1975 | Watanabe | 360/137 |
| 4,127,883 | 11/1978 | Mestdagh | 360/105 |
| 4,259,702 | 3/1981 | Franke | 360/96.5 |
| 4,453,189 | 6/1984 | Ida | 360/96.3 |
| 4,459,640 | 7/1984 | Latasiewicz et al. | 361/399 X |
| 4,571,647 | 2/1986 | Tanaka et al. | 360/105 |

FOREIGN PATENT DOCUMENTS

| 2740300 | 3/1978 | Fed. Rep. of Germany | 360/96.4 |
|---|---|---|---|
| 55-67901 | 5/1980 | Japan | 360/137 |
| 58-155501 | 9/1983 | Japan | 369/292 |
| 59-207001 | 11/1984 | Japan | 369/292 |

*Primary Examiner*—John H. Wolff
*Attorney, Agent, or Firm*—Hill, Van Santen, Steadman & Simpson

[57] ABSTRACT

A cassette tape recorder having a printed circuit board on which electronic parts forming an electronic circuit of a tape recorder are mounted, in which the board is used as a chassis. A tape cassette can be loaded onto this printed circuit board so that the whole of the cassette tape recorder can be reduced in thickness. In the event the printed circuit board is warped, the perpendicularity of a capstan relative to a cassette tape can be maintained so as to maintain stable running of the cassette tape even though the printed circuit board is warped.

6 Claims, 5 Drawing Sheets

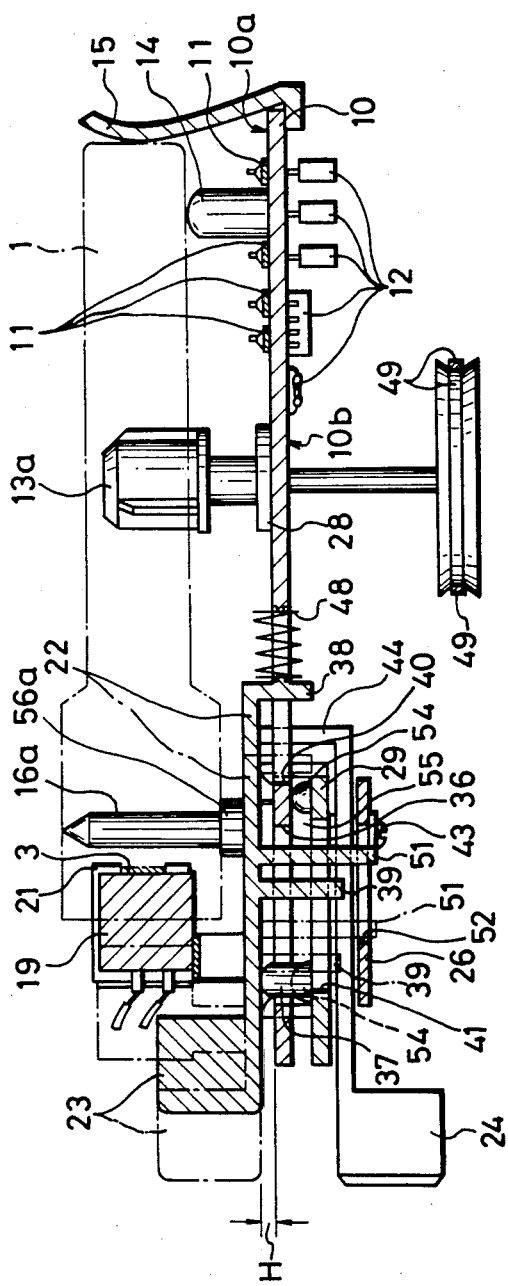
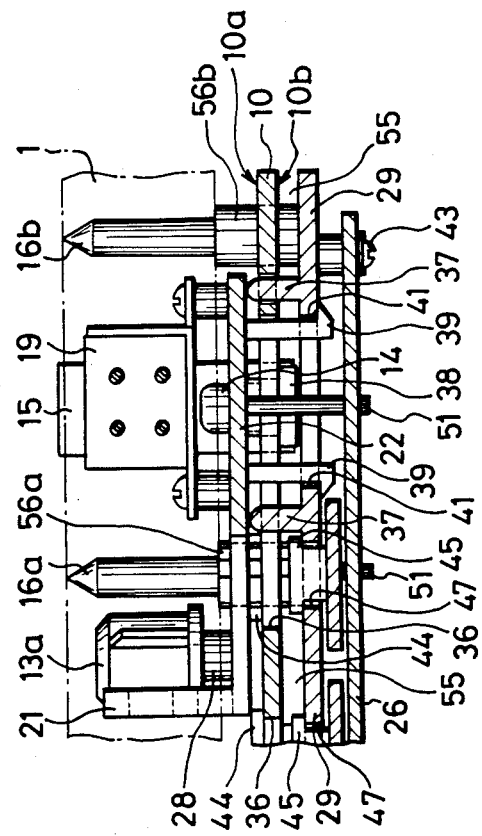
FIG. 5
FIG. 6

CASSETTE TAPE RECORDER

This is a continuation of application Ser. No. 903,138, filed Sept. 3, 1986.

BACKGROUND OF THE INVENTION

1. Field of the Invention

The present invention relates generally to a cassette tape recorder and, more particularly, is directed to a thin cassette tape recorder.

2. Description of the Prior Art

Cassette tape recorders are known in which the parts forming the cassette tape recorder are directly mounted at predetermined positions on a printed circuit board and where electrical interconnections for the respective parts are made by a printed wiring pattern. For example, such a cassette tape recorder is disclosed in Japanese Laid Open Utility Model No. 52-164519 which was published on Dec. 13, 1977.

In a cassette tape recorder where cassette positioning pins, a capstan and so on, are directly mounted on the printed circuit board which forms the chassis and a tape cassette is loaded thereto by utilizing the abovementioned prior art technique, if the printed circuit board is warped due to the change of temperature, dimensional variations and the like, the angles or the like of the cassette positioning pins and the capstan relative to the cassette tape will change. If the perpendicularity of the capstan relative to the cassette tape is changed, the running or operation of the cassette tape becomes unstable so that the recording and reproducing characteristics deteriorate.

SUMMARY OF THE INVENTION

Accordingly, it is a general object of this invention to provide an improved cassette tape recorder.

It is an object of this invention to provide a cassette tape recorder in which the perpendicularity of a capstan relative to a cassette tape is maintained even if a printed circuit board used as a chassis is warped.

It is another object of this invention to provide a cassette tape recorder which can be suitably used as a reproducing cassette tape recorder employing a compact tape cassette.

According to one aspect of the present invention, there is provided a cassette tape recorder comprising:

(a) a printed circuit board having mounted thereon electronic parts forming an electronic circuit for a tape recorder and parts forming a pair of reel tables;

(b) a guide base having mounted thereon cassette positioning pins and a capstan; and (c) coupling means for coupling said printed circuit board and said guide base so that a clearance is maintained therebetween.

These and othere objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 5 is a cross-sectional view of the main portion of the cassette tape recorder taken along a line 5—5 in FIG. 3; and FIG. 6 a cross-sectional view of the main portion of the cassette tape recorder taken along a line 6—6 in FIG. 3.

DESCRIPTION OF THE PREFERRED EMBODIMENT

Figure 1:
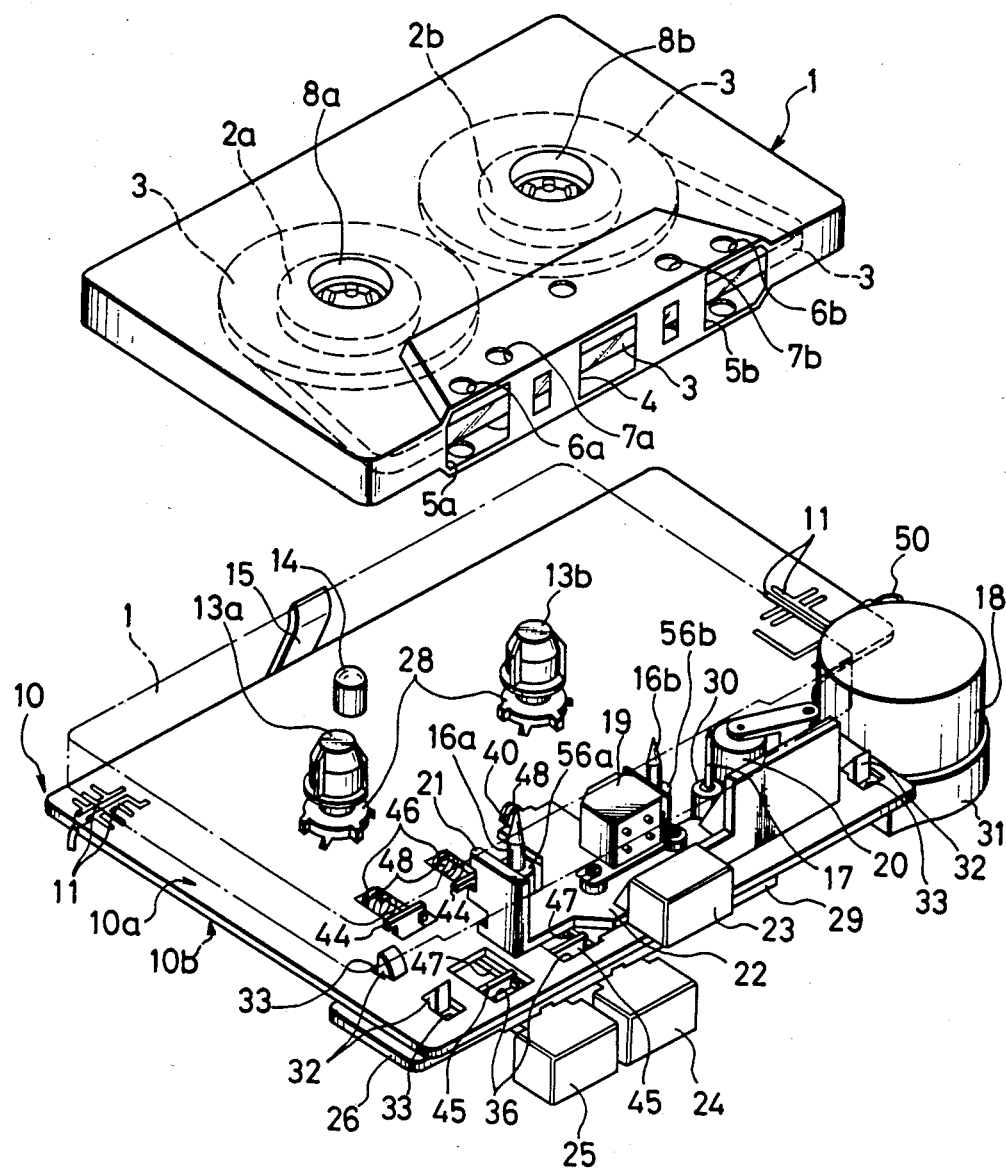
FIGS. 1 and 2 are exploded perspective views illustrating an overall arrangement of an embodiment of a cassette tape recorder according to the present invention.

Referring now to the attached drawings, an embodiment of a cassette tape recorder according to the present invention is hereinafter described in detail. The cassette tape recorder in this embodiment is used only to reproduce a compact tape cassette.

An overall arrangement of the cassette tape recorder of this invention will be described first with reference to FIGS. 1 to 5.

As shown in the figures, a tape cassette (compact tape cassette) 1 carries a cassette tape 3, such as a magnetic tape, wound around a pair of left and right reel hubs 2a and 2b. The tape cassette 1 also includes a head insertion opening 4, a pair of left and right pinch roller insertion openings 5a and 5b, a pair of capstan insertion openings 6a and 6b, a pair of cassette positioning pin insertion openings 7a and 7b, and a pair of reel table insertion openings 8a and 8b.

A printed circuit board 10 provides an electronic circuit for a tape recorder and a large number of electronic parts 12 (FIG. 5) are mounted at predetermined positions on wiring patterns 11 that are formed on the printed circuit board 10 In this case, an upper surface 10a of the printed circuit board 10 is constructed as a wiring pattern surface and a lower surface 10b thereof is constructed as a surface on which assembly parts are mounted.

The printed circuit board 10 is a chassis for the tape recorder. To this printed circuit board 10, there are attached a pair of left and right reel tables 13a and 13b, a cassette mounting table 14, a cassette holding spring 15, a pair of left and right cassette positioning pins 16a and 16b, a capstan 17, a motor 18, a magnetic head 19 which is a reproduce head, a pinch roller 20, a tape guide 21, a head attaching table 22, push buttons, such as a playback button 23, a fast forward button 24, a stop button 25, mechanism parts, such as a push button lock plate 26 and so on, various kinds of other springs and various kinds of mechanism parts, such as a lever, a switch and so on.

The pair of left and right reel tables 13a and 13b are attached through a pair of left and right reel table bearings 28, 28 to the upper surface 10a of the printed circuit board 10 so as to be freely rotatable. Similarly, the cassette mount table 14 and the cassette hold spring 15 are attached at a side of upper surface 10a of the printed circuit board 10.

The pair of left and right cassette positioning pins 16a and 16b, the capstan 17 and the motor 18 are all mounted on a guide base 29 which is made of synthetic resin. In this case, the pair of cassette positioning pins 16a and 16b are formed integrally with the guide base 29, while the capstan 17 and the motor 18 are mounted on the guide base 29 such that the capstan 17 is rotatably supported by a capstan bearing 30 formed integrally with the guide base 29 and the motor 18 is fixedly mounted on a motor mounting portion 31, which is also integrally formed with the guide base 29. The guide base 29 is detachably mounted on the lower surface 10b of the printed circuit board 10, such that a pair of engage nails or spring clips 32, formed integrally with the guide base 29 at each of its ends, each engage openings such as 33 formed through the printed circuit board 10. The cassette positioning pins 16a and 16b and the capstan 17 extend above the upper surface 10a through insertion openings 34a, 34b and 35 formed through the printed circuit board 10. The motor 18 is connected to the wiring pattern 11 of the printed circuit board 10 at its predetermined place by way of a lead wire 50.

The magnetic head 19, the pinch roller 20 and the tape guide 21 are mounted on the head mounting table 22 made of synthetic resin. In this case, the tape guide 21 is formed integrally with the head mounting table 22. The head mounting base 22 is positioned on the side of the upper surface 10a of the printed circuit board 10 and is supported on upper surfaces of a pair of projections 37, which are formed integrally with the guide base 29 and on its upper portion and which extend through openings 36 in the printed circuit board 10 to the side of its upper surface 10a. Further, the head mounting table 22 is slidably and detachably mounted on the upper surface 10a of the printed circuit board 10, such that a T-type guide member 38 and a pair of engage nails or spring clips 39 (FIG. 5) integrally formed with the lower side of the head mounting table 22 engage guide openings 40 and 41, respectively, formed through the printed circuit board 10 and the guide base 29.

Figure 4:
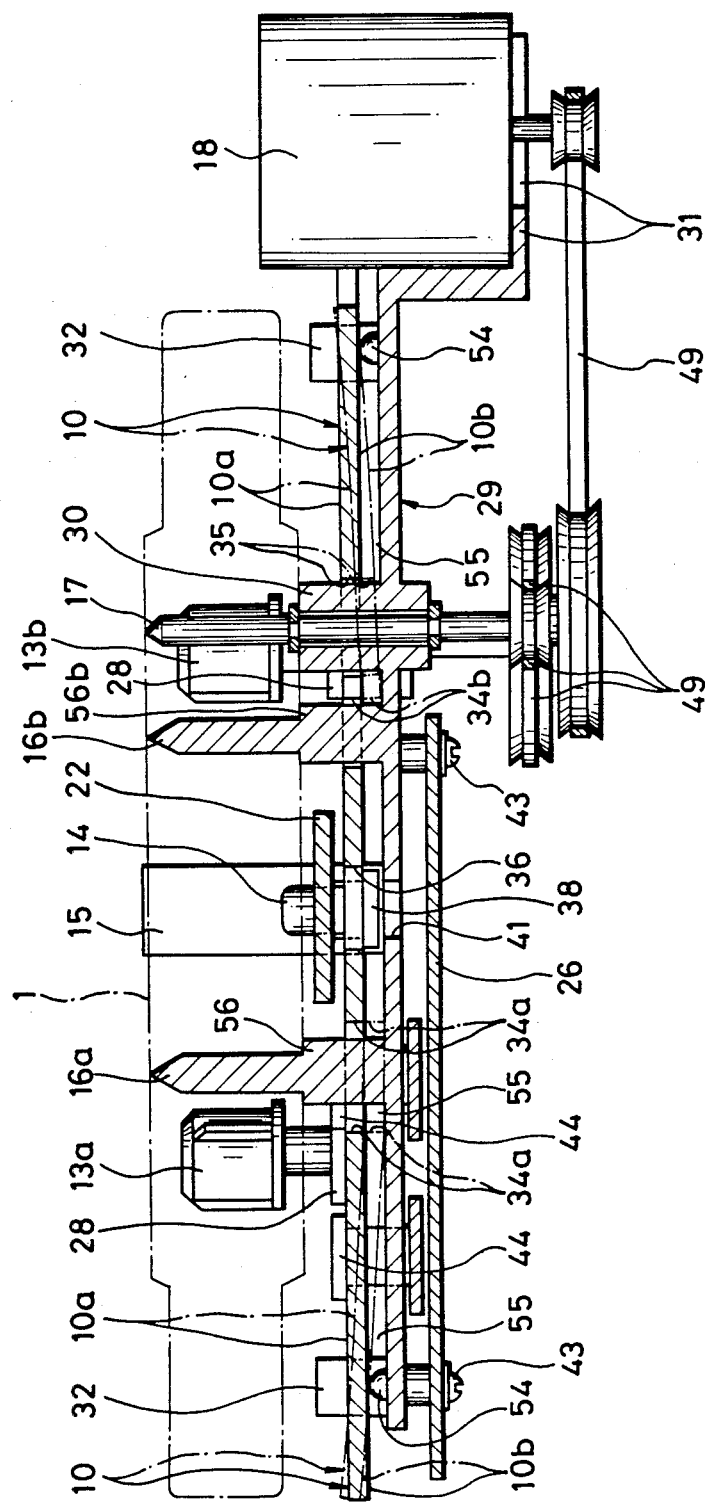
FIG. 4 is a cross-sectional view of a main portion of the cassette tape recorder taken along a line 4—4 in FIG. 3.

The push button lock plate 26 is slidably screwed to the lower side of the guide base 29 through a pair of screws 43 which are inserted through a pair of elongated openings 42 formed through both ends thereof in its longitudinal direction. The buttons, such as the fast forward button 24, the stop button 25 and so on, are located between the guide base 29 and the push button lock plate 26. These push buttons are slidably attached to the printed circuit board 10, such that T-type guide members 44 and 45 integrally formed on the upper side of each of these push buttons respectively engage guide openings 46 and 47 formed through the printed circuit board 10 and the guide base 29. In this case, the playback button 23 is molded integrally on the head attaching table 22. The slide members, such as the head mount table 22, the fast forward button 24, the stop button 25, the push button lock plate 26 and the like are biased in the return direction by return springs 48. The motor 18, the reel table 13b and the capstan 17 are ganged or connected through a belt 49 (FIG. 4).

The cassette tape recorder of the invention is constructed as described above. As shown by a one-dot chain line in FIGS. 1, 3 and 5, the tape cassette 1 is horizontally loaded onto the upper surface 10a of the printed circuit board 10, the reel hubs 2a and 2b are respectively engaged with the reel tables 13a and 13b and the cassette tape 3 is stretched to the capstan 17. In this case, the tape cassette 1 engages the cassette positioning pins 16a and 16b, is carried on the cassette mount table 14 and is fixed thereon by the cassette hold spring 15 so that the tape cassette 1 is horizontally placed at a predetermined position with a predetermined height from the guide base 29 as a reference.

After the tape cassette 1 is loaded as described above, when the playback button 23 is moved from the returned position shown by a one-dot chain line in FIG. 5 to the position shown by a solid line in FIG. 5, the head mount base table 22 is slid to the solid-line position against the spring force or the return spring 48, wherein a lock pin 51 integrally formed on the lower side of the head mount base table 22 is locked to a lock opening 52 of the push button lock plate 26. Then, the magnetic head 19, the pinch roller 20 and the tape guide 21 are inserted into the tape cassette 1, whereby the magnetic head 19 and the tape guide 21 come in contact with the cassette tape 3 and the cassette tape 3 is closely contacted with the capstan 17 by the pinch roller 20. Then, a switch (not shown) mounted on the printed circuit board 10 is operated by the head mount table 22 to thereby drive the motor 18 with the result that the reel table 13b and the capstan 17 are rotated. Thus, the cassette tape 3 is transported at a constant speed by the capstan 17 and thereby a predetermined playback is carried out.

When a fast forward button 24 is depressed, the switch is operated similarly and the motor 18 is actuated so that the cassette tape 3 is transported in the fast forward mode by the reel table 13b.

When the stop button 25 is depressed in the playback mode or the fast forward mode, the locking of the head mount base table 22 of the fast forward button 24, etc., by the push button lock plate 26 is released and these slide members are returned by the return spring 48. As a result, the switch is turned off, and thus the motor 18 is stopped.

A main portion of the cassette tape recorder of the invention will be described with reference to FIGS. 4 to 6.

The printed circuit board 10 and the guide base 29 are coupled with each other as earlier noted. In this case, when the lower surface 10b of the printed circuit board 10 is placed on upper surfaces of each pair of protrusions 54 integrally formed with the guide base 29 on its upper surface in its longitudinal direction, the printed circuit board 10 and the guide base 29 are vertically coupled with a spacing or clearance 55 therebetween in the vertical direction.

Accordingly, even if the printed circuit board 10 is warped due to the temperature characteristic, dimensional variation and the like as shown by a one-dot chain line in FIG. 4, such warping of the printed circuit board 10 is absorbed into the clearance 55 so that such warping can be prevented from adversely influencing the cassette positioning pins 16a, 16b and the capstan 17 mounted on the guide base 29. Therefore, even when the printed circuit board 10 is warped, the perpendicularity of the capstan 17 relative to the cassette tape 3 within the tape cassette 1, which is positioned horizontally by the cassette positioning pins 16a and 16b, can be prevented from being changed.

Figure 2:
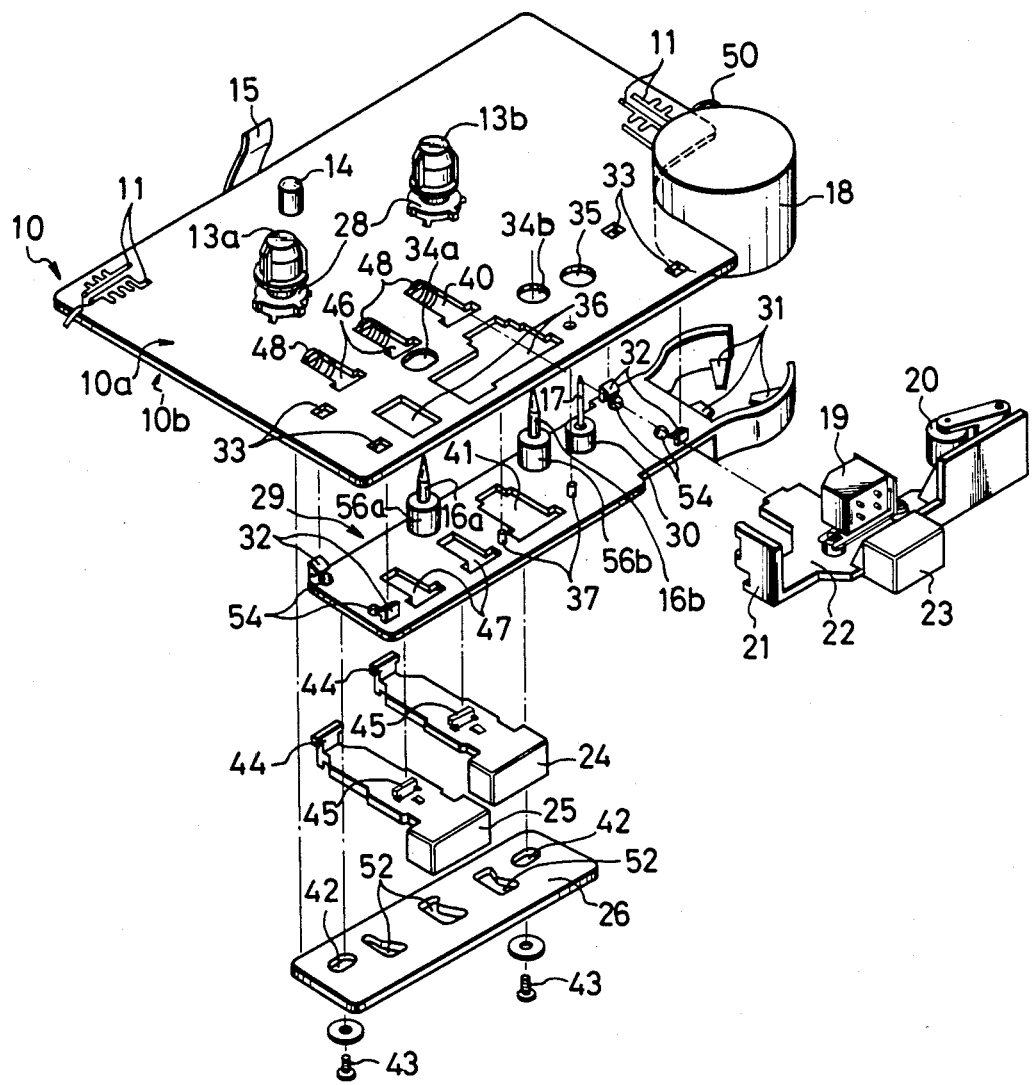
Figure 3:
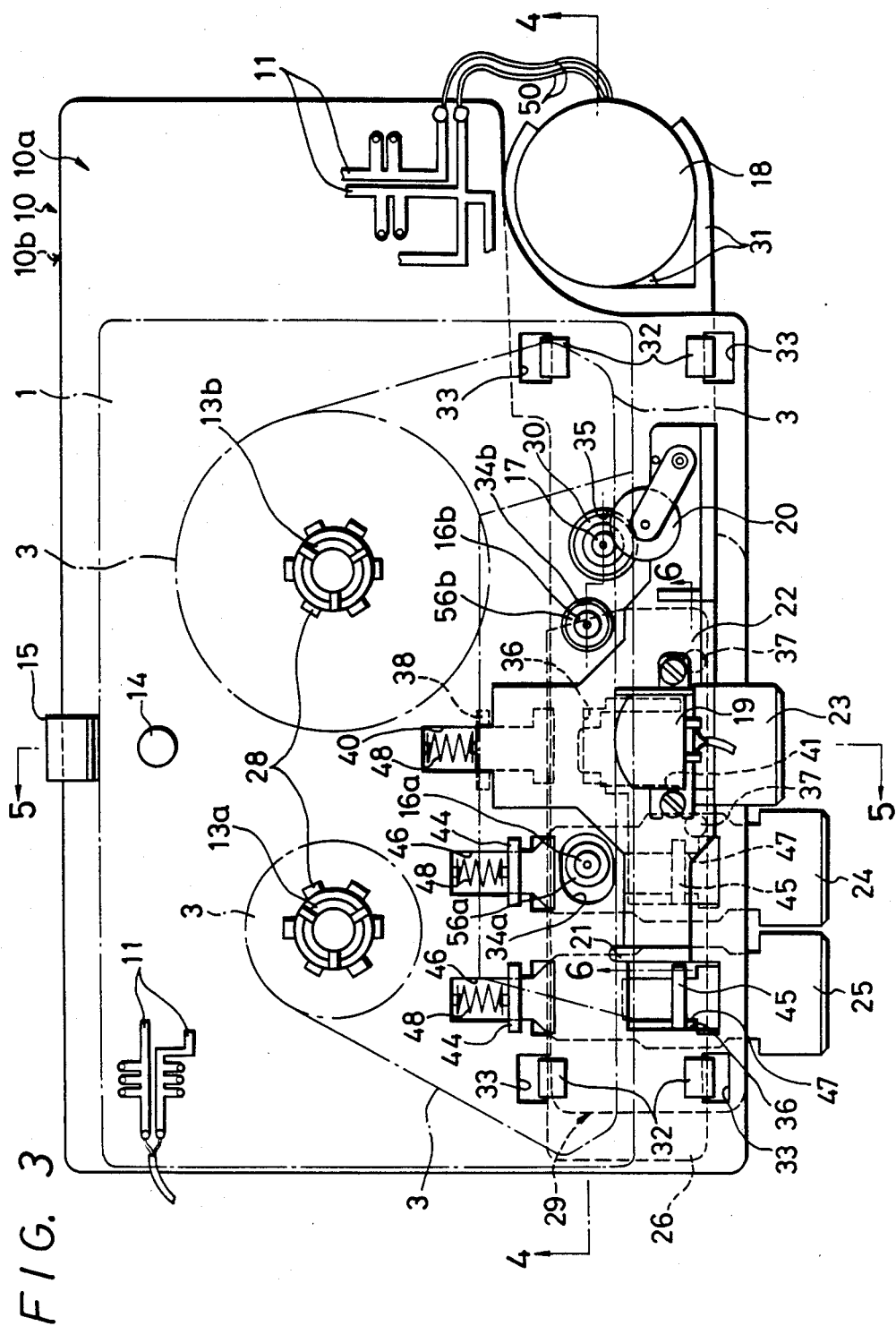
FIG. 3 is a plan view of the overall arrangement of the cassette tape recorder of this invention.

Referring to FIGS. 2 and 4 where the cassette positioning pin insertion openings 34a and 34b formed through the printed circuit board 10 and into which cassette mount base tables 56a and 56b, which are respectively the base portions of the cassette positioning pins 16a and 16b, are inserted, one of the insertion openings 34b is constructed as a reference opening (opening whose diameter is substantially equal to the diameter of the cassette mount base table 56b), while the other insertion opening 34a is constructed as an elongated opening, the pitch displacement of both the insertion openings 34a and 34b caused when the printed circuit board 10 is warped can be absorbed to thereby protect the cassette positioning pins 16a and 16b from the influence of warping of the printed circuit board The head mount base table 22 is carried on the upper surfaces of the pair of protrusions 37, which are integrally formed with the guide base 29 on its upper surface and slidably mounted on the upper surface 10a of the printed circuit board 10 as earlier described. In this case, since the pair of protrusions 37 extend upwards above the upper surface 10a of the printed circuit board 10, the head mount base table 22 can be slid on the guide base 29 in that it is floated from the upper surface 10a, which is the wiring pattern surface of the printed circuit board 10 by a predetermined height H (see FIG. 5).

Consequently, without affecting the flux or concavity and convexity (i.e., concavity or convexity of the pattern, etc.) on the upper surface 10a, which is the wiring pattern surface of the printed circuit board 10, at all, the head mount base table 22 can be slid very smoothly.

Since the cassette positioning pins 16a and 16b for restricting the height of the tape cassette 1 are provided on the guide base 29 which supports the head mount base table 22 above the same by the protrusions 37, the heights of the tape cassette 1 and the magnetic head 19 can be accurately restricted on the basis of the guide base 29. As a result, without the influences such as the warp of the printed circuit board 10 and so on, the height of the magnetic head 19 relative to the cassette tape 3 can be accurately restricted Further, while the printed circuit board 10 and the guide base 29 are coupled with each other by using the pair of screws 43, if the engaging method using the engage nail or spring clip 32 and the engage opening 33 is adopted as shown in the embodiment of the invention, the printed circuit board 10 and the guide base 29 can be easily coupled and/or detached with a one-touch action.

Further, if the protrusion 54 shown in this embodiment is made of elastic materials, such as rubbers and the like, it is possible to provide a buffer property between the printed circuit board 10 and the guide base 29.

Furthermore, the present invention is not limited to a cassette tape recorder which uses a compact tape cassette but can be applied to various kinds of cassette tape recorders using a micro-tape cassette and various kinds of other tape cassettes.

Although the cassette tape recorder of the invention utilizes as a chassis the printed circuit board which is easily warped by the temperature characteristic, dimensional variation and so on, it can prevent the perpendicularity of the capstan relative to the cassette tape from being changed by the warp of the printed circuit board. Accordingly, it is possible to prevent the running of the cassette tape from becoming unstable due to warping of the printed circuit board. Thus, the present invention can provide a cassette tape recorder whose recording and reproducing characteristics are very excellent and which is very high in reliability.

The above description is given on a preferred embodiment of the invention, but it will be apparent that many modifications and variations could be effected by one skilled in the art without departing from the spirit or scope of the novel concepts of the invention so that the scope of the invention should be determined by the appended claims only.

We claim as our invention:

1. A cassette tape recorder comprising:
   (a) a printed circuit board having mounted thereon electronic parts forming an electronic circuit of the tape recorder and also adapted for receiving a cassette;
   (b) a guide base having mounted thereon cassette positioning means and a capstan for substantially perpendicularly engaging a cassette and a tape therein;
   (c) coupling means for coupling said printed circuit board and said guide base, whereby a clearance spacing is maintained therebetween;
   (d) said printed circuit board defines a plurality of insertion openings and said cassette positioning means and capstan mounted on said guide base are positioned thereon for insertion into appropriate ones of said insertion openings in said printed circuit board; and
   (e) wherein said clearance spacing between the printed circuit board and guide base is maintained even in the event said printed circuit board becomes warped in use.

2. A cassette tape recorder as in claim 1, wherein said guide base is provided on its surface opposed to said printed circuit board with a first engage nail and a first protrusion, and said printed circuit board includes an engage nail receiving opening therein, and said first engage nail is coupled to said opening, and said protrusion contacts said printed circuit board to maintain said clearance between said printed circuit board and said guide base, and said guide base is of a synthetic resin and said cassette positioning means and support means for said capstan are molded integrally therewith.

3. A cassette recorder according to claim 2, further comprising a head mount plate located above said printed circuit board at its surface opposite to said guide base and having attached thereto a magnetic head, said guide base having a second protrusion, said head mount plate having a second engage nail formed integrally therewith, said guide base having a guide opening therethrough, and said second engage nail being coupled to said guide opening, whereby said head mount plate slidably contacts with said second protrusion.

4. A cassette tape recorder according to claim 1, wherein said guide base is provided with a capstan drive motor.

5. A cassette tape recorder according to claim 1, wherein said printed circuit board is provided with a cassette mount table and a cassette hold spring.

6. A cassette tape recorder according to claim 1, wherein there are further provided tape cassette engaging reels and tape engaging support means mounted to said printed circuit board.

* * * * *